United States Patent [19]

Spietschka et al.

[11] Patent Number: 4,496,731
[45] Date of Patent: Jan. 29, 1985

[54] PROCESS FOR THE PREPARATION OF PERYLENE-3,4,9,10-TETRACARBOXYLIC ACID N,N'-DIALKYLDIIMIDE PIGMENTS

[75] Inventors: Ernst Spietschka, Idstein; Manfred Urban, Wiesbaden, both of Fed. Rep. of Germany

[73] Assignee: Hoechst Aktiengesellschaft, Fed. Rep. of Germany

[21] Appl. No.: 469,222

[22] Filed: Feb. 24, 1983

[30] Foreign Application Priority Data

Mar. 6, 1982 [DE] Fed. Rep. of Germany ....... 3208192

[51] Int. Cl.$^3$ .................... C07D 471/06; C09B 5/62
[52] U.S. Cl. .................... 546/37; 106/288 Q
[58] Field of Search ........................... 546/37

[56] References Cited

U.S. PATENT DOCUMENTS

| | | | |
|---|---|---|---|
| 3,332,931 | 7/1967 | Braun | 546/37 |
| 3,615,800 | 10/1971 | Spietschka et al. | 546/37 |
| 3,628,976 | 12/1971 | Stocker | 546/37 |
| 4,018,791 | 4/1977 | Spietschka et al. | 546/37 |
| 4,153,602 | 5/1979 | Schiessler et al. | 546/37 |

FOREIGN PATENT DOCUMENTS

| | | | |
|---|---|---|---|
| 2726682 | 12/1978 | Fed. Rep. of Germany | 546/37 |
| 1279879 | 6/1972 | United Kingdom . | |
| 1370433 | 10/1974 | United Kingdom . | |

*Primary Examiner*—Donald G. Daus
*Assistant Examiner*—William A. Teoli, Jr.
*Attorney, Agent, or Firm*—Connolly and Hutz

[57] ABSTRACT

The invention relates to a process for the preparation of perylene-3,4,9,10-tetracarboxylic acid N,N'-dialkyldiimides by reacting perylene-3,4,9,10-tetracarboxylic acid dianhydride with an alkylamine in aqueous suspension at a low temperature, in the course of which the bis-(alkylammonium) salt of perylene-3,4,9,10-tetracarboxylic acid bis-N-alkylamide is formed. The latter is reacted with a metal salt to give the corresponding sparingly soluble metal salt, which is subjected to the cyclization reaction at an elevated temperature. The pigments prepared by the process according to the invention are distinguished by high purity and are suitable for pigmenting lacquers and plastic compositions.

10 Claims, No Drawings

PROCESS FOR THE PREPARATION OF PERYLENE-3,4,9,10-TETRACARBOXYLIC ACID N,N'-DIALKYLDIIMIDE PIGMENTS

The invention relates to a process for the preparation of perylene-3,4,9,10-tetracarboxylic acid N,N'-dialkyldiimide in the form of a pigment. The invention also relates to the use of the pigments thus prepared for pigmenting lacquers for coats of paint having a yellowish-tinged red, clear color shade.

Perylene-3,4,9,10-tetracarboxylic acid N,N'-dialkyldiimides, in particular perylene-3,4,9,10-tetracarboxylic acid N,N'-dimethyldiimide (C.I. Pigment Red 179, formula No. 71,130), have already been known for a long time as substances. The following processes have been described for their preparation.

German Auslegeschrift No. 2,726,682 describes a process in which perylene-3,4,9,10-tetracarboxylic acid diimide is methylated in an aqueous medium with a methylating agent, such as a methyl halide or dimethyl sulfate. Owing to the insolubility in the reaction medium of the starting material and of the end product, complete reaction is not achieved. The end product is, therefore, always contaminated with perylene-3,4,9,10-tetracarboxylic acid diimide and perylene-3,4,9,10-tetracarboxylic acid imide-N-methylimide. Owing to its red-violet intrinsic coloration, this mixture results in pigments which produce dull, maroon-colored coats of paint.

The reaction is also carried out in a heterogeneous system in the process described in German Offenlegungsschrift No. 1,963,728, in which the alkylation of perylene-3,4,9,10-tetracarboxylic acid diimide is carried out by means of dimethyl sulfate or the other dialkyl sulfates. During the reaction of the perylene-3,4,9,10-tetracarboxylic acid diimide with the dimethyl sulfate, a treatment with salt is carried out in the presence of solvents in order to achieve fine distribution.

Complete reaction is not achieved in this procedure either, which also results in a mixture of products of varying degrees of alkylation and consequently results in pigments which produce only dull, maroon-colored coats of paint. The high content of salt and solvent raises additional problems in respect of effluent.

German Offenlegungsschrift No. 2,153,087 describes a process for the preparation of perylene-3,4,9,10-tetracarboxylic acid N,N'-dimethyldiimide in a red form without dulling by-products, in which 1 mole of perylene-3,4,9,10-tetracarboxylic acid dianhydride is subjected to a condensation reaction with 2 moles of methylamine at 120° to 140° C. In this process the two stages (formation of N-alkylamide or bis-N-alkylamide and cyclization reaction to give the diimide) do not take place successively, but simultaneously, so that the production of a uniform pigment particle size would not be expected in this procedure. The product thus obtained must subsequently be subjected to an additional comminution process, for example grinding with salt, and converted into pigment form.

German Auslegeschrift No. 2,504,481 describes the reaction of 1 mole of perylene-3,4,9,10-tetracarboxylic acid dianhydride with 4-8 moles of methylamine at 0° to 5° C. to give the bis-(methylammonium) salt of perylene-3,4,9,10-tetracarboxylic acid bis-N-methylamide, which is then cyclized by increasing the temperature to give perylene-3,4,9,10-tetracarboxylic acid N,N'-dimethyldiimide. Although the product is obtained in pigment form, it suffers from a number of technical shortcomings in use. By-products, which can be removed by an after-treatment, are formed as the result of the condensation reaction being incomplete. These pigments are not completely satisfactory in respect of transparency and tinctorial strength. Furthermore, these pigments also produce a considerable increase in the viscosity of the lacquers.

It has now been found that perylene-3,4,9,10-tetracarboxylic acid N,N'-dialkyldiimides are obtained in high purity and in excellent pigment quality if the bis-(alkylammonium) salt of perylene-3,4,9,10-tetracarboxylic acid bis-N-alkylamide which is formed in the reaction of perylene-3,4,9,10-tetracarboxylic acid dianhydride with an alkylamine is converted, by means of ions of a divalent metal, into the corresponding sparingly soluble metal salts, and if the cyclization to give the perylene-3,4,9,10-tetracarboxylic acid N,N'-dialkyldiimides is carried out with these salts. In particular, the invention concerns a process for the preparation of perylene-3,4,9,10-tetracarboxylic acid N,N'-dialkyldiimides of the formula I

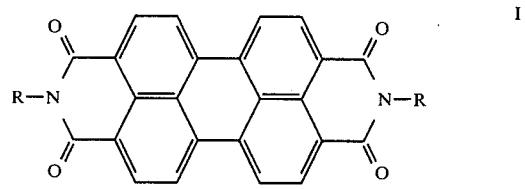

in which R is an alkyl, in particular lower alkyl, such as methyl or ethyl group, by reacting perylene-3,4,9,10-tetracarboxylic acid dianhydride with an alkylanine R-NH$_2$ in an aqueous suspension at a low temperature, with the formation of the bis-(alkylammonium) salt of perylene-3,4,9,10-tetracarboxylic acid bis-N-alkylamide (formula II)

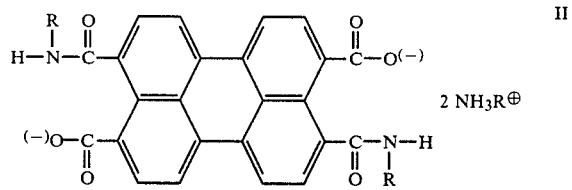

and cyclization at an elevated temperature, which comprises reacting the salt of the formula II with a metal salt with the formation of a sparingly soluble salt of the formula III

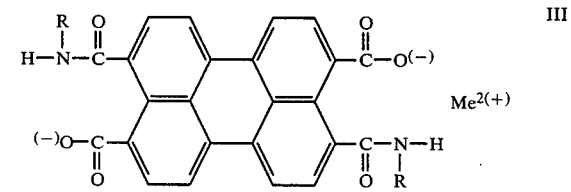

in which Me denotes a divalent metal of the second main group and sub-group of the periodic system or divalent iron, preferably Ca, Sr, Ba or Zn, and subjecting the salt of the formula III to a cyclization reaction at an elevated temperature.

An advantageous procedure consists in suspending perylene-3,4,9,10-tetracarboxylic acid dianhydride in 10 to 40 times, preferably 15 to 30 times, its weight of water, in which an alcohol can also be dissolved, and adding dropwise, at about 0° to about 30° C., preferably about 0° to about 10° C., a 4-molar to 10-molar, preferably 6-molar to 8-molar, amount of an alkylamine. An aqueous solution of a metal salt is then added dropwise at $-10°$ C. to $+25°$ C., preferably at $-5°$ C. to $+10°$ C., whereupon the sparingly soluble salt of the formula III is precipitated. The cyclization reaction to give the perylene-3,4,9,10-tetracarboxylic acid N,N'-dialkyldiimide of the formula I is then carried out at a temperature of about 20° to about 150° C., preferably about 50° to about 100° C. Finally, if appropriate, an aqueous acid, advantageously hydrochloric acid, formic acid or acetic acid, is added to the pigment suspension in order to render the metal hydroxide formed in the cyclization reaction more readily capable of being washed out as its salt formed. The pigment is then worked up in the usual manner by filtration with suction, washing and drying.

The perylene-3,4,9,10-tetracarboxylic acid dianhydride is advantageously employed in a ground, dry form or, preferably, as a moist press cake.

The precipitated metal salt of the formula III can, if appropriate, be isolated at about 0° to about 10° C. and, after being suspended in water, can be subjected to the cyclization reaction at the elevated temperatures indicated.

Water-soluble salts, advantageously chlorides or nitrates, of the metals of the second main group and subgroup of the periodic system or of divalent iron, preferably of calcium, strontium, barium or zinc, are employed for the metal salt solution. The concentration of the metal salt solution is not critical. It is also possible to add the metal salt in a solid form (powder form) instead of adding it as an aqueous solution. At least about 2 moles of the metal salt are used for the precipitation of the salt of the formula III.

Depending on the end use, surface-active substances can be added, if desired, before, during or after the cyclization reaction, in order to improve the properties.

The following may be mentioned as surface-active agents: anionic substances, such as fatty acid taurides, fatty acid N-methyltaurides, fatty acid isethionates, alkylbenzenesulfonates, alkylnaphthalenesulfonates, alkylphenol polyglycol ether-sulfates and fatty alcohol polyglycol ether-sulfates, fatty acids, for example palmitic, stearic and oleic acid, soaps, for example alkali metal salts of fatty acids, naphthenic acids and resin acids, for example abietic acid, and alkali-soluble resins, for example colophony-modified maleate resins, cationic substances, such as quaternary ammonium salts, fatty amine ethylates, fatty amine polyglycol ethers and fatty amines, nonionic substances, such as fatty alcohol polyglycol ethers, fatty acid polyglycol esters and alkylphenol polyglycol ethers.

It is also possible to employ mixtures of surface-active agents. The quantity can vary within wide limits: 0.1 to 20% by weight, preferably 5 to 10% by weight, relative to the pigment end product.

If desired, after the pigment press cake has been suction-drained, a finish can be obtained by means of an organic solvent. The organic solvents employed can be alcohols or chlorinated aromatic hydrocarbons.

In addition to the use of surface-active agents and/or solvents, the pigment properties can also be affected favorably by subjecting, before the addition of the acid or before the filtration with suction, the pigment suspension obtained after the cyclization reaction to an after-treatment in dispersing equipment such as bead mills, roll mills or vibratory mills.

The excess alkylamine can be recovered by distillation.

The pigments obtained by the process according to the invention are distinguished by high purity, i.e. freedom from by-products, by a very fine, uniform primary particle size and by excellent tinctorial and rheological behaviour. They are used for coloring lacquers and plastic compositions, and are particularly suitable for coloring metallic paints. They produce yellowish-tinged red coats of paint which are transparent, clear, deep in color and fast to weathering. Pigments having a higher hiding power are, however, obtainable under some of the process conditions.

In the following Examples parts always denote parts by weight.

EXAMPLE 1

150 parts of dry perylene-3,4,9,10-tetracarboxylic acid dianhydride which has been ground in a pin disc mill were introduced, while stirring, into 3,000 parts of S-water (softened water) in a round-bottomed glass flask equipped with a thermometer, a stirrer, a feed inlet and a degassing outlet. After cooling to about 0° C., 222 parts of a 45.5% strength by weight aqueous solution of monomethylamine were added dropwise to the resulting suspension in the course of about 10 minutes. Stirring was contined for a further 15 minutes at about 0° C. A solution of 84.9 parts of anhydrous calcium chloride in 250 parts of S-water was added dropwise, at about 0° C., to the resulting solution, in the course of 15 minutes, and stirring was continued for 1 hour at about 0° C. in order to ensure that the formation of the sparingly soluble salt of the formula III in which $R=CH_3$ and $Me=Ca$ was complete. The resulting suspension was heated to about 80° C. and stirring was continued for 1 hour at about 80° C. until the cyclization reaction was complete. A suspension of 16 parts of distearyldimethylammonium chloride and 700 parts of S-water was then added dropwise and stirring was continued for 1 hour at about 80° C. After cooling to about 50° C., 98% strength formic acid was added dropwise at this temperature until a pH value of about 7 had been reached. Stirring was continued for ½ hour at about 50° C. and the resulting pigment was filtered off with suction, washed free from chloride ions with S-water and dried at about 80° C. in a circulating air cabinet.

This gave 173.8 parts of a yellowish-tinged red pigment of the formula I, $R=CH_3$, which is excellently suitable for pigmenting lacquers, in particular metallic paints—because of its high transparency.

EXAMPLE 2

The procedure described in Example 1 was followed, but 165 parts of barium chloride were used instead of 84.9 parts of $CaCl_2$. This gave 173 parts of a clear, red pigment which has an increased hiding power compared with the pigment from Example 1 and which is also excellently suitable for pigmenting lacquers.

EXAMPLE 3

The procedure described in Example 1 was followed, but 180 parts of strontium chloride were used instead of 84.9 parts of $CaCl_2$. This gave 174 parts of a clear, red pigment which has an increased hiding power compared with the pigment from Example 1 and which is also excellently suitable for pigmenting lacquers.

EXAMPLE 4

The procedure described in Example 1 was followed, but 92.2 parts of zinc chloride were used instead of 84.9 parts of $CaCl_2$, and aqueous hydrochloric acid, approximately 15.5% strength, was added instead of formic acid, until a pH value of about 1 had been reached. This gave 172.5 parts of a clear, red pigment which is excellently suitable for pigmenting lacquers, particularly top lacquers.

EXAMPLE 5

150 parts of perylene-3,4,9,10-tetracarboxylic dianhydride (=540 parts of moist press cake) were introduced, while stirring, into 3,000 parts of S-water in a round-bottomed glass flask such as was used in Examples 1 to 4. 16 parts of a commercially available 50% strength by weight aqueous resin soap were introduced into the resulting suspension, and, after cooling to about 0° C., 222 parts of a 45.5% strength by weight aqueous solution of monomethylamine were added dropwise in the course of 10 minutes. Stirring was continued for a further 15 minutes at about 0° C. A solution of 84.9 parts of anhydrous calcium chloride in 250 parts of S-water were added dropwise, at about 0° C., to the resulting solution in the course of 15 minutes, and stirring was continued for 1 hour at about 0° C. in order to ensure that the formation of the sparingly soluble salt of the formula III in which $R=CH_3$ and $Me=Ca$ was complete. The suspension was heated to about 80° C. and stirring was continued for 1 hour at about 80° C. until the cyclization reaction was complete. A suspension of 8 parts of distearyldimethylammonium chloride and 350 parts of S-water was then added dropwise, and stirring was continued for 1 hour at about 80° C. After cooling to about 50° C., 98% strength formic acid was added dropwise at this temperature until a pH value of about 7 had been reached. Stirring was continued for ½ hour at about 50° C. and the resulting pigment was filtered off with suction, washed free from chloride ions with S-water and dried at about 80° C. in a circulating air cabinet.

This gave 172.3 parts of a yellowish-tinged red pigment of the formula I, $R=CH_3$, which is excellently suitable for pigmenting lacquers, particularly metallic paints—because of its high transparency.

EXAMPLE 6

The procedure described in Example 5 was followed, but 6,000 parts of S-water were used, instead of 3,000 parts, to suspend the perylene-3,4,9,10-tetracarboxylic acid dianhydride. This gave 172.2 parts of a yellowish-tinged red pigment which is also excellently suitable for pigmenting lacquers, in particular metallic paints—because of its high transparency.

EXAMPLE 7

The procedure described in Example 5 was followed, but the mixture was heated to only about 50° C., instead of to about 80° C., before adding the distearyldimethylammonium chloride suspension, and stirring was continued for one hour at about 50° C., the distearyldimethylammonium chloride suspension was added dropwise at this temperature and stirring was continued for one hour. This gave 170.8 parts of a yellowish-tinged red pigment which is also excellently suitable for pigmenting lacquers, in particular metallic paints—because of its high transparency.

EXAMPLE 8

The procedure described in Example 5 was followed, but the mixture was heated in a V4A autoclave to about 125° C., instead of to about 80° C., before adding the distearyldimethylammonium chloride suspension, and stirring was continued for one hour at about 125° C., and the distearyldimethylammonium chloride suspension was then added dropwise at 80° C. and stirrinng was continued for one hour. This gave 174.8 parts of yellowish-tinged red pigment which is excellently suitable for pigmenting lacquers and plastic compositions.

EXAMPLE 9

The procedure described in Example 5 was followed, but 3,000 parts of a 10% strength by weight aqueous solution of methanol was used, instead of 3,000 parts of S-water, to suspend the perylene-3,4,9,10-tetracarboxylic acid dianhydride. This gave 175.7 parts of a yellowish-tinged red pigment which is excellently suitable for pigmenting lacquers.

EXAMPLE 10

The procedure described in Example 5 was followed, but, before being filtered off with suction, the pigment suspension was ground for one hour in a bead mill and was then heated to about 80° C. and stirred for a further 3 hours at this temperature. This gave 165 parts of a yellowish-tinged red pigment which is excellently suitable for pigmenting lacquers, in particular metallic paints—because of its high transparency.

EXAMPLE 11

The procedure described in Example 5 was followed, but 275 parts of a 50% strength by weight aqueous solution of monoethylamine was used instead of 222 parts of a 45.5% strength by weight aqueous solution of monomethylamine. This gave 185.7 parts of a yellowish-tinged red pigment of the formula I, $R=C_2H_5$, which is excellently suitable for pigmenting lacquers and plastic compositions.

EXAMPLE 12

222 parts of a 45.5% strength by weight aqueous solution of monomethylamine and 15 parts of a commercially available, highly concentrated nonylphenol polyglycol ether were introduced, while stirring, into 3,000 parts of S-water in a round-bottomed glass flask such as was used in Examples 1 to 11, followed, after cooling to about 0° C., by 150 parts of perylene-3,4,9,10-tetracarboxylic acid dianhydride, added in the course of one hour. The resulting suspension was stirred for a further hour at about 0° C., and a solution of 84.9 parts of anhydrous calcium chloride in 250 parts of S-water was added dropwise in the course of 15 minutes at this temperature, and stirring was continued for one hour at about 0° C. The mixture was then heated to the boil and stirred for a further 2 hours at the boil, during which time monomethylamine was removed by distillation. The resulting pigment was filtered off with suction, washed free from chloride ions, and until it was neutral, with S-water and dried at about 80° C. in a circulating air cabinet.

This gave 172.5 parts of a yellowish-tinged red pigment of the formula I, $R=CH_3$, which is excellently suitable for pigmenting lacquers.

EXAMPLE 13

The procedure described in Example 12 was followed, but 15 parts of oleic acid were used instead of 15 parts of a commercially available, highly concentrated nonylphenol polyglycol ether. This gave 175 parts of a yellowish-tinged red pigment which is excellently suitable for pigmenting lacquers and, in particular, plastic compositions.

We claim:

1. A process for the preparation of a perylene-3,4,9,10-tetracarboxylix acid N,N' dialkyldiimide of the formula

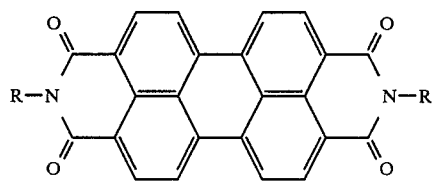

(1)

in which R is lower alkyl, from the compound of the formula

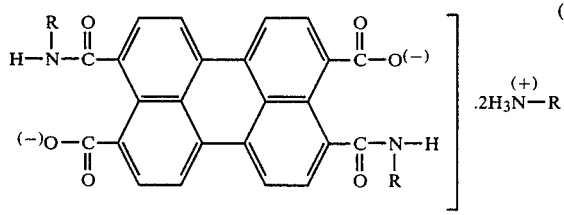

(2)

said compound of the formula (2) having been derived from the corresponding perylene-3,4,9,10-tetracarboxylic anhydride and about 4 to 10 moles, per mole of said anhydride of an alkyl amine of the formula R-NH$_2$, R being lower alkyl, said process comprising the steps of:

reacting with each mole of said compound of formula (2) at least two moles of a water soluble inorganic chloride or nitrate salt of at least one of the divalent metals Ca, Ba, Sr, or Zn or of divalent iron in aqueous medium in order to form a sparingly soluble salt of the formula

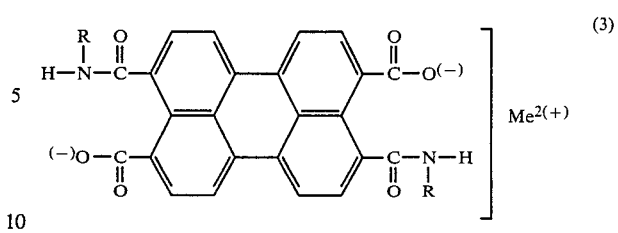

(3)

in which Me is a said divalent metal or the divalent iron, and subjecting said salt of fomula (3) to a cyclization reaction at a temperature of from 20° to 150° C. and washing to remove the soluble inorganic anion.

2. The process according to claim 1, wherein the ammonium salt is reacted with said salt of the divalent metal at a temperature of from −5° C. to +10° C.

3. The process according to claim 1, wherein the cyclization reaction of the metal salt of the perylene-tetracarboxylic acid bis-N-alkylamide is carried out at a temperature of from 50° to 100° C.

4. A process according to claim 1 wherein R is methyl or ethyl.

5. A process according to claim 2 wherein R is methyl or ethyl.

6. A process according to claim 3 wherein R is methyl or ethyl.

7. The process according to claim 1, wherein an anionic, cationic or nonionic surface-active compound or a mixture thereof or a lower alcohol is added before, during or after the cyclization reaction.

8. The process according to claim 4, wherein a surface-active substance or a lower alcohol is added before, during or after the cyclization reaction.

9. The process as claimed in claim 7, wherein the said surface active compound or mixture which is added is a fatty acid tauride, fatty acid N-methyl tauride, fatty acid isethionate, alkylbenzene-sulfonate, alkylnaphthalene-sulfonate, alkylphenol polyglykol ether-sulfate, fatty alcohol polyglykol-ether-sulfate, fatty acid, alkalimetal salt of a fatty acid, naphthenic acid, resin acid, alkali-soluble resin, quaternary ammonium salt, fatty amine ethylate, fatty amine polyglycol ether, fatty amine, fatty alcohol polyglycol ether or a fatty acid polyglycol ester or mixtures thereof.

10. The process as claimed in claim 1, wherein 6 to 8 moles of alkylamine are reacted per mole of the perylene-3,4,9,10-tetracarboxylic acid dianhydride.

* * * * *